US011987768B2

(12) United States Patent
Kotoneva et al.

(10) Patent No.: US 11,987,768 B2
(45) Date of Patent: May 21, 2024

(54) PROCESS FOR REFINING CRUDE TALL OIL

(71) Applicant: UPM-KYMMENE CORPORATION, Helsinki (FI)

(72) Inventors: Jari Kotoneva, Helsinki (FI); Timo Äijälä, Helsinki (FI)

(73) Assignee: UPM-KYMMENE CORPORATION, Helsinkl (FI)

( * ) Notice: Subject to any disclaimer, the term of this patent is extended or adjusted under 35 U.S.C. 154(b) by 0 days.

(21) Appl. No.: 18/208,412

(22) Filed: Jun. 12, 2023

(65) Prior Publication Data

US 2023/0407203 A1 Dec. 21, 2023

(30) Foreign Application Priority Data

Jun. 15, 2022 (FI) ..................................... 20225534

(51) Int. Cl.
*C11B 3/12* (2006.01)
*C10G 3/00* (2006.01)

(52) U.S. Cl.
CPC .................. *C11B 3/12* (2013.01); *C10G 3/50* (2013.01); *C10G 2400/02* (2013.01); *C10G 2400/04* (2013.01); *C10G 2400/08* (2013.01); *C10G 2400/26* (2013.01)

(58) Field of Classification Search
CPC ......... C11B 3/12; C10G 3/50; C10G 2400/02; C10G 2400/04; C10G 2400/08; C10G 2400/26; C10C 1/10
See application file for complete search history.

(56) References Cited

U.S. PATENT DOCUMENTS

| | | | | |
|---|---|---|---|---|
| 3,594,317 A * | 7/1971 | Nevanlinna | C09K 8/22 507/139 |
| 3,859,107 A | 1/1975 | Garcia | |
| 4,076,700 A | 2/1978 | Harada et al. | |
| 10,240,095 B2 * | 3/2019 | Nousiainen | C10L 1/04 |
| 2013/0232851 A1 * | 9/2013 | Nousiainen | C10G 3/40 202/113 |

FOREIGN PATENT DOCUMENTS

| | | |
|---|---|---|
| EP | 1586624 A1 | 10/2005 |
| EP | 2940111 A1 | 11/2015 |

(Continued)

OTHER PUBLICATIONS

JP 2002372204A English Translation (Year: 2023).*

(Continued)

*Primary Examiner* — Randy Boyer
*Assistant Examiner* — Juan C Valencia
(74) *Attorney, Agent, or Firm* — CANTOR COLBURN LLP

(57) ABSTRACT

The disclosure relates to a method for refining crude tall oil, wherein the method comprises first evaporating tall oil material (10) in a first evaporator (100) whereafter the first fraction (11) is fed to a first distilling column (200) and the second fraction (12) is fed to further evaporation. The condensate(s) recovered from the further evaporation(s) is fed to a second distilling column (300).
The present disclosure further concerns the use of different fractions obtained by the method for the production of biofuels or components thereof.

22 Claims, 2 Drawing Sheets

(56) References Cited

FOREIGN PATENT DOCUMENTS

| | | | | | |
|---|---|---|---|---|---|
| EP | 3594317 | A1 | * | 1/2020 | ............. B01D 1/065 |
| EP | 3594317 | A1 | | 1/2020 | |
| JP | 2002372204 | A | * | 12/2002 | |
| WO | 2009106696 | A1 | | 9/2009 | |
| WO | WO-2014098763 | A1 | * | 6/2014 | ............... B01D 3/10 |
| WO | 2015055896 | A1 | | 4/2015 | |
| WO | 2022015223 | A1 | | 1/2022 | |

OTHER PUBLICATIONS

Finnish Search Report for the corresponding Application No. FI20225534, dated Oct. 24, 2022; 1 page.

Communication of Acceptance for the corresponding Application No. FI20225534, dated Apr. 6, 2023; 6 pages.

* cited by examiner

PROCESS FOR REFINING CRUDE TALL OIL

CROSS REFERENCE TO RELATED APPLICATION

This application claims priority to and the benefit of Finnish Patent Application No. 20225534, filed Jun. 15, 2022, the contents of which is hereby incorporated by reference in its entirety.

FIELD OF THE DISCLOSURE

The present disclosure relates to an improved process for purifying crude tall oil, especially crude tall oil of different quality, by combining evaporation and distillation. More particularly the disclosure relates to a method for refining crude tall oil, wherein the method comprises first evaporating tall oil material in a first evaporator whereafter the first fraction is fed to a first distilling column and the second fraction is fed to further evaporation(s). The condensate(s) or vapour(s) recovered from the further evaporation(s) is fed to a second distilling column.

The present disclosure further concerns the use of different fractions obtained by the method of the disclosure, especially a recovered crude fatty acid fraction combined of a crude fatty acid fraction obtained from the first distilling column and a crude fatty acid fraction obtained from the second distilling column, for the production of biofuels or components thereof.

BACKGROUND OF THE DISCLOSURE

Biomass is increasingly recognized as a valuable feedstock to be used as a sustainable alternative to petroleum, for the production of hydrocarbons, which are suitable as biochemicals, fuels or fuel components. There is an increasing interest in alternative feedstocks for replacing at least partly crude oil, in the production of for example as transportation fuels or components compatible with fuels.

Renewable energy sources represent the potential fuel alternatives to overcome the global energy crises in a sustainable and eco-friendly manner. In future, biofuels and biochemicals may replenish the conventional non-renewable energy resources due to their renewability and several other advantages.

Biofuels and biochemicals are typically manufactured from feedstock originating from renewable sources, including oils and fats obtained from plants, animals, algal materials, fish and various waste streams, side streams and sewage sludge. These feedstocks, particularly the various waste streams and side streams, contain varying amounts of contaminants, such as gums, phospholipids and other phosphorus compounds, metals and metal compounds, which are, for example, deleterious to converting catalysts. One of these sources is crude tall oil (CTO) obtained as a by-product of the kraft process of wood pulp manufacture. Crude tall oil is a mixture of components with different boiling points and thus a multistage process is usually needed in order to overcome the challenges of handling this complex feedstock in manufacturing processes.

Despite the ongoing research and development of processes for processing biomass, especially crude tall oil, there is still a need to provide an improved process for converting biomass, to valuable chemicals and hydrocarbons suitable as feed for hydrotreated vegetable oil fuels or fuel blending components.

BRIEF DESCRIPTION OF THE DISCLOSURE

An object of the present disclosure is to provide an improved process for purifying crude tall oil, especially crude tall oil of different quality, such as crude tall oils comprising impurities.

The disclosure is based on the idea of combining evaporation and distillation to obtain an optimized process for recovering valuable fractions, especially fractions for the production of biofuels or components thereof.

The object of the disclosure is achieved by a method and use which are characterized by what is stated in the independent claims. The preferred embodiments of the disclosure are disclosed in the dependent claims.

More in detail the disclosure is based on the idea of using separate distilling columns for fatty acids boiling at different temperatures. By separating a first and second fraction from a first evaporator and distilling the first fraction to recover the fatty acids of the first fraction, a more advantageous process can be used for the second fraction treated by evaporation and distillation. Preferably, the feed to the first distilling column, the first fraction, is 6-25 wt %, preferably 6-18 wt %, more preferably 8-15 wt % of the tall oil material used as feedstock. The feed to the second distilling column, the third fraction or the combined third and fourth fraction, is typically 50-75 wt % and the residue fraction is typically 15-25 wt %, preferably 15-30 wt % of the tall oil material used as feedstock. The first CFA fraction obtained from the first distilling column is typically 5-12 wt % of the tall oil material used as feedstock. The crude sulphate turpentine fraction, comprising most of the silicon components, is typically about 2-3 wt % of the tall oil material used as feedstock and the rest is typically a water fraction. The second CFA fraction obtained from the second distilling column is typically 50-60 wt % of the tall oil material used as feedstock. The tall oil rosin fraction is typically about 15-25 wt % and the tall oil pitch rosin about 10-15 wt % of tall oil material used as feedstock. The first CFA fraction is typically 8-20 wt % of the combined CFA fraction.

An advantage of the method of the disclosure is that most of the fatty acids of the tall oil material feed is recovered as a combined crude fatty acid fraction.

Further, the obtained crude fatty acid fractions of the first and second distilling column, which can be used as hydrotreated vegetable oil (HVO) feed, comprises less impurities compared to fractions obtained for example by only evaporation systems. Further, also other fractions, optionally recovered from the first and second distilling column, comprise low amounts of impurities. For example, a crude sulphate turpentine fraction (turpentine fraction), optionally recovered from the first distilling column, typically has an acid number below 5, preferably below 3, more preferably below 1, most preferably the acid number is or near 0, indicating that the recovered crude sulphate turpentine fraction comprises no fatty acids. Most of the silicon components are also recovered in the crude sulphate turpentine fraction. The amount of silicon in the crude sulphate turpentine fraction is typically 100-500 ppm.

An advantage of the method of the disclosure is that fatty acids separated in the first evaporator as part of the first fraction are still recovered as crude fatty acid in the first distilling column. Since more light components such as water, crude sulphate turpentine (CST), silicon components, light fatty acids and light neutrals are separated as the first fraction, these light components do not interfere the process of further evaporation of the second fraction. For example, the pressure is more easily maintained, and the evaporation(s) following the first evaporation takes place in a more controlled manner because low boiling light components do not cause so much "carry over". When water and light components are first evaporated from the tall oil material in the first evaporation, the following evaporation(s) are more efficient. In addition to recovering a crude fatty acid fraction also other light components can be, if desired, refined further in another process or sold further as such.

Typically, impurities, such as metals and solids remaining in the second fraction are retained in the concentrate and the condensate(s) or vapour(s) retrieved from the second evaporation and optional third evaporation are fed to the second distilling column. If evaporation is accomplished in three steps, the residual fraction containing pitch is minimized by evaporating the concentrate or vapour fraction of the second evaporation in an additional third evaporation.

A still further advantage of using three evaporators is that the second evaporator in the second evaporation can be a small and cheap evaporator that removes lighter components from the feed material. The following third evaporator can also be smaller and cheaper than the second evaporator in two-step evaporation. Consequently, a three-step evaporation unit can be cheaper than a two-step evaporation unit.

A still further advantage of the present invention compared to those known from the prior art is that the material purified according to the present invention is ready to be fed to hydroprocessing and the hydroprocessing is able to produce fuel components with excellent yield, especially due to the low amounts of impurities.

A further advantage of the present invention is that the amount of impurities in the product fractions is low.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
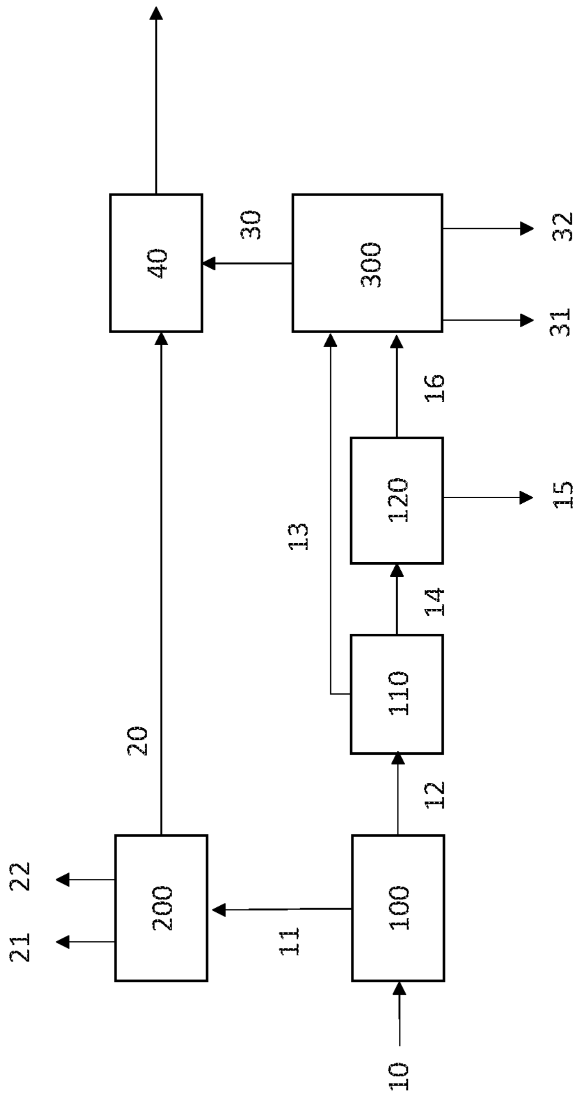
FIG. 1 shows a schematic flow diagram representing one embodiment of the purification process.

The disclosure relates to a method for refining crude tall oil, wherein the method comprises first evaporating tall oil material in a first evaporator at a temperature between 255 and 295° C. and a pressure between 80 and 220 mbar to obtain a first fraction comprising crude sulphate turpentine, light fatty acids, light neutrals, silicon components as impurities and water and a second fraction comprising fatty acids, resin acids, neutral substances and residue components. The second fraction is then either evaporated in a second evaporator at a temperature between 230 and 270° C. and a pressure between 5 and 20 mbar to obtain a third fraction comprising fatty acids, resin acids and light neutral substances, and a first concentrate fraction whereafter the first concentrate fraction is evaporated in a third evaporator at a temperature between 280 and 320° C. and a pressure between 5 and 20 mbar to produce a fourth fraction comprising fatty acids, resin acids and light neutral substances, and a residue fraction or alternatively, the second fraction is evaporated in only one further evaporator at a temperature between 300 and 340° C. and a pressure between 3 and 10 mbar to obtain an alternative third fraction comprising fatty acids, resin acids, neutral substances and an alternative residue fraction. The first fraction obtained in the first evaporation is distilled in a first distilling column to obtain a crude fatty acid fraction. The third and fourth fractions obtained from the second and third evaporator or alternatively the third fraction obtained from the second evaporator, if only a second evaporator is used, is distilled in a second distilling column to obtain a crude fatty acid fraction. A combined crude fatty acid fraction from the first distilling column and the second distilling column is recovered.

The disclosure relates to different fractions obtained by the method of the disclosure, especially a recovered crude fatty acid fraction combined of a crude fatty acid fraction obtained from a first distilling column and a crude fatty acid fraction obtained from a second distilling column.

The disclosure further relates to using the recovered combined crude fatty acid fraction of the embodiments of the disclosure as feedstock for hydroprocessing, preferably for production of biofuels or components thereof, preferably for the production of one or more biofuels or components thereof selected from the group consisting of gasoline, naphtha, jet fuel, diesel and fuel gases.

According to some embodiments of the disclosure, water and crude sulphate turpentine fractions are typically recovered from the first distilling column. Typically, the crude sulphate turpentine of the recovered crude sulphate turpentine fraction has an acid number below 5, preferably below 3, more preferably the acid number is near 0 or 0 measured according to SCAN-T 11.

Further, according to some embodiments of the disclosure, a tall oil rosin fraction and/or a tall oil pitch rosin fraction are typically recovered from the second distilling column. In some embodiments of the disclosure, the method further comprises obtaining rosin soap from the tall oil rosin fraction and/or tall oil pitch rosin fraction.

According to some embodiments of the disclosure fractions recovered from the first distilling column or the second distilling column are used as biochemicals, for production of biofuels or components thereof.

The term "tall oil material" in connection with the present disclosure refers to a by-product of Kraft pulping of wood, especially coniferous wood. The tall oil material is a sole crude tall oil or a mixture of different crude tall oils.

The term "crude tall oil" is generated in the Kraft chemical pulping of trees for paper and other products. In a Kraft mill, wood chips are treated with a cooking liquor (or white liquor) containing sodium hydroxide and sodium sulphide to dissolve the lignin (delignification) of wood in order to produce pulp. Extractives in wood (resin acid, fatty acid, neutral and oxidized substances) react with the cooking liquor. After the cooking stage, residual used cooking liquor (now called weak black liquor) is separated from pulp during a washing step. This weak black liquor contains the valuable pulp cooking chemicals which are extracted from the liquor in the pulp mill recovery boiler before being re-used in the pulping process. On top this weak black liquor a floating layer of soap containing solid materials is formed.

This layer of soap has strong foaming properties and needs to be removed from the weak black liquor in order to allow the chemicals to be extracted in the recovery boiler. First, weak black liquor is evaporated to achieve a dry solids content of 30% for optimal removal of the soap layer and to allow combustion of the black liquor in the chemicals recovery boiler. This evaporation results in strong black liquor, which is fed to the pulp mill recovery boiler. In the evaporation step the layer is soap is removed and now called Crude sulphate soap (CSS). CSS can either be burned as process fuel or further processed into crude tall oil. Crude tall oil is mainly composed of both saturated and unsaturated oxygen-containing organic compounds such as unsaponifiable matter, neutral substances including sterols and esters, resin acids (mainly abietic acid and its isomers), fatty acids (mainly palmitic acid, linoleic acid, oleic acid and linolenic acid), fatty alcohols, sterols and other alkyl hydrocarbon derivatives. The handling and cooking of the wood causes break down of the triglyceride structures and hence crude tall oil does not contain any significant amounts of triglycerides. Typically, crude tall oil contains some amounts of impurities such as inorganic sulphur compounds, sodium, potassium, calcium, magnesium, silicon, and phosphorus. The composition of the crude tall oil varies depending on the specific wood species.

The understanding of quality of crude tall oil depends on the end use. In addition to the amount of impurities, different qualities of crude tall oil typically depend on rosin acid content and acid number (AN) value, defined as milligrams of potassium hydroxide per gram (mgKOH/g) crude tall oil. The relative proportions of rosin acids and fatty acids are typically related. In general, the higher the rosin contents, the lower the unsaponifiables content and also to some extent the fatty acid content. Fuel quality crude tall oil typically contains a relatively high level of fatty acids (typically up to 65%), has a relatively low acid number value (typically <135 mgKOH/g) and low rosin acid content (typically <23%).

The term "neutrals" in connection with the present disclosure refers to esters, unsaponifiables (monomeric neutrals such as sterols and alcohols) as well as polymeric neutrals (polymers).

The term "unsaponifiables" in connection with the present disclosure refers to substances which lack the ability to form soaps, i.e. cannot be saponified by caustic treatment. Typical unsaponifiables are higher aliphatic alcohols, sterols, and hydrocarbons, particularly fatty alcohols ($C_{20}$-$C_{24}$), sterols ($C_{30}$) and carotenes, and various other alkyl- and cycloalkyl hydrocarbon derivatives ($C_{10}$-$C_{30}$).

The term "evaporator" in connection with the present disclosure refers to a device where evaporation takes place. Evaporation is a unit operation thermally separating solutions based on component volatility. It takes advantage of vapor pressure differences of different components.

The term "distilling column" or "distillation column" in connection with the present disclosure refers to a device where distillation takes place. A typical distillation column comprises a vertical shell where the separation of liquid components is carried out, column internals such as trays or plates and/or packings which are used to enhance component separations, a reboiler to provide the necessary vaporisation for the distillation process, a condenser to cool and condense the vapour leaving the top of the column, a reflux drum to hold the condensed vapour from the top of the column so that liquid (reflux) can be recycled back to the column. Typically, the feed is introduced near the middle of the column to a tray known as the feed tray and the feed tray divides the column into a top (enriching or rectification) section and a bottom (stripping) section. The feed flows down the column where it is collected at the bottom in the reboiler. Heat is supplied to the reboiler to generate vapour. The source of heat input is normally steam. The vapour raised in the reboiler is re-introduced into the unit at the bottom of the column. The liquid removed from the reboiler is known as the bottoms product or simply, bottoms. The vapour moves up the column and it is cooled by a condenser when it exits the top of the unit. Typically, the condensed liquid is stored in a holding vessel known as the reflux drum and some of this liquid is recycled back to the top of the column and this is called the reflux. The condensed liquid that is removed from the system is known as the distillate or top product.

Typically, in embodiments of the disclosure a common reboiler is used for the heating both the evaporator(s) and/or distilling column(s).

In embodiments of the disclosure the tall oil material used as feedstock is a sole crude tall oil or a mixture of different crude tall oils. Preferably the tall oil material comprises low-quality crude tall oil, more preferably the low-quality crude tall oil comprises above 50 ppm impurities, preferably 50-700 ppm, more preferably at least 100-500 ppm, most preferably at least 250-400 ppm impurities such as the total amount of restricted metals critical for catalysts (including Ca, Fe, K, Mg, Na, As), optionally together with the amounts of silicon and/or phosphor, all measured by X-ray fluorescence spectrometry (XRF) or by inductively coupled plasma optical emission spectrometry (Xylene/ICP-OES, ASTM D 5185). The feedstock of the embodiments of the disclosure either comprises tall oil material feedstock or consists of tall oil material feedstock, preferably the tall oil material is the sole feedstock. The tall oil material may also partly comprise crude tall oil which has been slightly purified or modified for example in a falling film evaporator, centrifuge and/or decanter centrifuge, however crude tall oil or mixtures of crude tall oil are preferred. The amount of resin acids, fatty acids, neutrals and acid number of some crude tall oils is shown in Table 1. Examples of typical amounts of impurities in crude tall oil are shown in Table 2.

TABLE 1

Examples of crude tall oil

| Description | Analysis method | CTO 1 | CTO 2 | CTO 3 | CTO 4 |
|---|---|---|---|---|---|
| Resin acids Wt-% | SCAN-T 14 | 26.7 | 27.6 | 21.8 | 32.4 |
| Acid number mg/KOH/g | SCAN-T 11 | 144.4 | 147.2 | 132.5 | 150.9 |
| Neutrals Wt-% | Internal, calc. | 25.7 | 24.2 | 31.9 | 22 |
| Fatty acids Wt-% | Internal, calc. | 47.6 | 48.2 | 46.3 | 45.6 |

TABLE 1 cont. Examples of crude tall oil

| Description | Analysis method | CTO 5 | CTO 6 | CTO 7 | CTO 8 | CTO 9 |
|---|---|---|---|---|---|---|
| Resin acids Wt-% | SCAN-T 14 | 25.3 | 26.1 | 16.7 | 31.3 | 35.9 |
| Acid number mg/KOH/g | SCAN-T 11 | 143.8 | 144.5 | 136.1 | 139.9 | 155.1 |
| Neutrals Wt-% | Internal, calc. | 26 | 25.7 | 30.5 | 27.6 | 19.7 |
| Fatty acids Wt-% | Internal, calc. | 48.7 | 48.2 | 52.8 | 41.1 | 44.4 |

TABLE 2

Amounts of impurities in crude tall oil (ppm)

| Compound | Analysis method | CTO 1 | CTO 2 | CTO 3 | CTO 4 |
|---|---|---|---|---|---|
| Tot. restrict. metals, (including Ca, Fe, K, Mg, Na, As) | XRF | 78 | 267 | 137 | 99 |
| Silicon, Si, ppm | XRF | 28 | 67 | 41 | 30 |
| Sodium, Na | XRF | 61 | 161 | 115 | 68 |
| Potassium, K | XRF | 7 | 35 | 23 | 5 |
| Calcium, Ca | XRF | 0 | 50 | 0 | 0 |
| Phosphorous, P | XRF | 35 | 10 | 24 | 16 |

TABLE 2 cont. Amounts of impurities in crude tall oil (ppm)

| Compound | Analysis method | CTO 5 | CTO 6 | CTO 7 | CTO 8 | CTO 9 |
|---|---|---|---|---|---|---|
| Tot. restrict. metals, (including Ca, Fe, K, Mg, Na, As) | XRF | 345 | 59 | 127 | 83 | 295 |
| Silicon, Si, ppm | XRF | 58 | 48 | 21 | 50 | 46 |
| Sodium, Na | XRF | 218 | 52 | 66 | 57 | 203 |
| Potassium, K | XRF | 127 | 7 | 25 | 8 | 9 |
| Calcium, Ca | XRF | 1 | 0 | 31 | 16 | 13 |
| Phosphorous, P | XRF | 27 | 13 | 64 | 15 | 9 |

The process of the method of the disclosure comprises evaporating tall oil material in a multistage evaporation, comprising two or three evaporators and utilizing two distilling columns. Examples of suitable evaporation methods are typically those utilizing thin film evaporation technology. The evaporators in the evaporation methods can thus be selected from the group consisting of thin film evaporators, falling film evaporators, short path evaporators, and any other evaporators using thin film evaporation technology. The evaporators can be either of the same type or different type and are selected independently from the above listed evaporators.

Typically, the method of treating the feedstock comprising tall oil material comprises the following steps (a) evaporating tall oil material in a first evaporator to produce a first fraction comprising crude sulphate turpentine, light hydrocarbons and water and a second fraction comprising fatty acids, resin acids, neutral substances and residue components, (b) evaporating said second fraction in at least one further evaporator to produce a third fraction comprising fatty acids, resin acids and light neutral substances, and a concentrate fraction or residue fraction, optionally evaporating the concentrate fraction in a further third evaporator to obtain a fourth fraction comprising fatty acids, resin acids and light neutral substances and a residue fraction, (c) distilling said first fraction in a first distilling column, (d) distilling said third fraction and optional fourth fraction in a second distilling column, (e) recovering a combined crude fatty acid fraction from said first and said second distilling columns.

In the method of the disclosure a first evaporator is used for separating a first fraction typically comprising crude sulphate turpentine, light fatty acids, light neutrals, silicon components and water and a second fraction comprising fatty acids, resin acids, neutral substances and residue components. The first fraction is distilled in a first distilling column. Typical analysis results for CFA of first distilling column and typical impurities of a first CFA fraction are shown in Table 3 and Table 4.

TABLE 3

Typical analysis results for CFA of first distilling column

| Description | Analysis method | 1. CFA 1 | 1. CFA 2 (100 mbar, 255° C.) | 1. CFA 3 (100 mbar, 275° C.) |
|---|---|---|---|---|
| Resin acids Wt-% | SCAN-T 14 | 2 | 7 | 10 |
| Acid number mg/KOH/g | SCAN-T 11 | 108 | 90 | 110 |
| Neutrals Wt-% | Internal | 46 | 54 | 43 |
| Fatty acids Wt-% | Internal | 52 | 39 | 46 |

TABLE 4

Impurities in 1. CFA (first distilling column)

| Compound | Analysis method | 1. CFA 1 ppm |
|---|---|---|
| Silicon, Si | ASTM D 5185 | 8.1 |
| Phosphorous, P | ASTM D 5185 | <5* |
| Sodium, Na | ASTM D 5185 | <10* |
| Iron, Fe | ASTM D 5185 | <0.5* |
| Potassium, K | ASTM D 5185 | <2* |
| Arsenic, As | ASTM D 5185 | <0.8* |
| Calcium, Ca | ASTM D 5185 | 2.0 |
| Magnesium, Mg | ASTM D 5185 | <0.5* |

*below detection limit

One or two further evaporator(s) are used for separating a residue fraction, typically called tall oil pitch (TOP) or TOP Fuel, from the second fraction separated in the first evaporator. Typical analysis results for tall oil pitch are shown in Table 5.

TABLE 5

Analysis results for tall oil pitch

| Description | Analysis method | TOP |
|---|---|---|
| Resin acids Wt-% | SCAN-T 14 | 14 |
| Acid number mg/KOH/g | SCAN-T 11 | 60 |
| Neutrals Wt-% | Internal | 69 |
| Fatty acids Wt-% | Internal | 17 |
| Impurities, Tot. Ca, Mg, Na, P, Si ppm | ASTM D 5185 | 480 |

The third and fourth fractions or a sole third fraction, is used as feed for the second distilling column. If only one additional evaporator, a second evaporator, is used, only a third fraction is used as feed in the second distilling column. If a second and third evaporator is used, the feed to the second distilling column consists of a third and fourth fraction. The size of the second and third evaporator is typically adjusted so that the feed (feed fraction) to the second distilling column consists of 40-70 wt % of said third fraction and 30-60 wt % said fourth fraction, preferably about 45-60 wt % of said third fraction and about 40-55 wt % of said fourth fraction. In some embodiments of the method of the disclosure, the process further comprises an additional pretreatment step of storing the tall oil material in a storage tank before the first evaporator. Typical analysis results of a feed fraction are shown in Table 6. Typical analysis results for second CFA fractions of the second distilling column and typical impurities of the second CFA fractions are shown in Table 7 and Table 8.

TABLE 6

Analysis results for feed to second distilling column

| Description | Analysis method | After evaporation |
|---|---|---|
| Resin acids Wt-% | SCAN-T 14 | 25 |
| Acid number mg/KOH/g | SCAN-T 11 | 144 |
| Neutrals Wt-% | Internal | 26 |
| Fatty acids Wt-% | Internal | 49 |
| Tot. restricted metals, (including Ca, Fe, K, Mg, Na, As), ppm | XRF | <46 |
| Silicon (Si), ppm | XRF | 23 |
| Phosphor (P), ppm | XRF | 13 |

TABLE 7

Typical analysis results for CFA of second distilling column

| Description | Analysis method | 2. CFA 1 | 2. CFA 2 | 2. CFA 3 |
|---|---|---|---|---|
| Resin acids Wt-% | SCAN-T 14 | 7.5 | 10.9 | 4.1 |
| Acid number mg/KOH/g | SCAN-T 11 | 169.4 | 177.0 | 185.9 |
| Neutrals Wt-% | Internal | 14.4 | 10.0 | 6.3 |
| Fatty acids Wt-% | Internal | 78.1 | 79.0 | 89.6 |

TABLE 8

Impurities in 2. CFA (second distilling column)

| Compound | Analysis method | 2. CFA 2 ppm | 2. CFA 3 ppm |
|---|---|---|---|
| Silicon, Si | ASTM D 5185 | 3 | 0.9 |
| Phosphorous, P | ASTM D 5185 | <5* | <5* |
| Sodium, Na | ASTM D 5185 | <10* | <10* |
| Iron, Fe | ASTM D 5185 | 0.87 | <0.5* |
| Potassium, K | ASTM D 5185 | <2* | <2* |
| Arsenic, As | ASTM D 5185 | <0.8* | <0.8* |
| Calcium, Ca | ASTM D 5185 | <2* | <2* |
| Magnesium, Mg | ASTM D 5185 | <0.5* | <0.5* |

*below detection limit

In embodiments of the disclosure the amount of metals of the combined crude fatty acid fraction, especially the amount of restricted metals (including (Ca), iron (Fe), potassium (K), magnesium (Mg), sodium (Na) and arsenic (As)) measured by X-ray fluorescence spectrometry (XRF) or by inductively coupled plasma optical emission spectrometry (Xylene/ICP-OES, ASTM D 5185), is typically below 20 ppm, preferably below 10 ppm, more preferably below 5 ppm, most preferably below 3 ppm, including the amount being between two of the following amounts: 20, 19, 18, 17, 16, 15, 14, 13, 12, 11, 10, 9, 8, 7, 6, 4, 3, 2, 1, 0.5, 0.4, 0.3, 0.2, 0.1 and 0 ppm, typically between 0.1 and 20 ppm, preferably between 0.2 and 15 ppm, more preferably between 0.5 and 5 ppm and most preferably between 0.5 and 3 ppm. For the restricted metals the total amount of calcium Ca, Fe, K, Mg, Na and As (ppm) of the combined crude fatty acid fraction is measured. Further, amounts of single impurities can also be measured by XRF or by Xylene/ICP-OES. The amount of phosphorous of the combined crude fatty acid fraction, measured by XRF or by Xylene/ICP-OES, is typically below 5 ppm, preferably below 2 ppm, more preferably below 1 ppm, most preferably below 0.5 ppm, including the amount being between two of the following amounts: 5, 4, 3, 2, 1, 0.5, 0.4, 0.3, 0.2, 0.1 and 0 ppm. Further, the amount of silicon (Si) of the combined crude fatty acid fraction, measured by XRF or by Xylene/ICP-OES, is typically below 15 ppm, preferably below 5 ppm, more preferably below 3 ppm, most preferably below 2 ppm, including the amount being between two of the following amounts: 15, 14, 13, 12, 11, 10, 9, 8, 7, 6, 5, 4, 3, 2, 1, 0.5, 0.4, 0.3, 0.2, 0.1 and 0 ppm, typically between 0.1 and 10 ppm, preferably between 0.2 and 5 ppm and more preferably between 0.5 and 2 ppm.

According to the embodiments of the disclosure, the first evaporator is typically a thin film evaporator or a short path evaporator, preferably a thin film evaporator. In order to obtain a suitable amount of first fraction, the temperature of the first evaporation is adjusted to a temperature selected from between 255° C. and 295° C., preferably evaporating tall oil material in said first evaporator is done at a temperature between 260° C. and 290° C., more preferably between 270° C. and 280° C., including the temperature being a temperature between two of the following temperatures; 255° C., 260° C., 270° C., 280° C., 290° C. and 295° C. at a pressure selected from between 80 to 220 mbar, preferably between 90 and 210 mbar, more preferably between 100 and 200 mbar, most preferably between 120 and 180 mbar.

According to the embodiments of the disclosure where three evaporators are used, the temperature of the second evaporation is adjusted to a temperature selected from between 230° C. and 270° C., preferably evaporating the second fraction obtained from the first evaporator in a second evaporator is done at a temperature between 235 and 265° C., preferably between 240 and 260° C., more preferably between 245 and 255° C., including the temperature being a temperature between two of the following temperatures; 230° C., 235° C., 240° C., 245° C., 250° C., 255° C., 260° C., 265° C. and 270° C. and/or at a pressure between 5 and 20 mbar, preferably between 6 and 18 mbar, more preferably between 8 and 15 mbar, most preferably between 10 and 12 mbar. Typically, the condensate or vapour retrieved from the second evaporation is ready to be fed to the second distilling column and the concentrate is fed to a third evaporator. The third evaporation temperature is adjusted to a temperature selected from between 280° C. and 320° C., preferably between 285 and 315° C., more preferably between 290 and 310° C., most preferably between 295 and 305° C., including the temperature being a temperature between two of the following temperatures; 280° C., 285° C., 290° C., 295° C., 300° C., 305° C., 310° C., 315° C. and 320° C. and/or at a pressure selected from between 3 to 15 mbar, preferably between 5 and 12 mbar and more preferably between 8 and 10 mbar. Typically, the condensate or vapour of the third evaporator is fed to the second distilling column together with the condensate or vapour of the second evaporator. If one of the third or fourth fraction is condensate and the other is vapour, the fractions are typically fed separately to the second distilling column.

According to the embodiments of the disclosure where two evaporators are used, the temperature of the second evaporation is higher than the temperature in the second evaporator of the embodiment utilizing three evaporators. In the two evaporator embodiment the temperature of the second evaporator is adjusted to a temperature selected from between 300° C. and 340° C., preferably evaporating the second fraction obtained from the first evaporator in a second evaporator is done at a temperature between 310 and 330° C., more preferably between 315 and 320° C., including the temperature being a temperature between two of the following temperatures; 300° C., 305° C., 310° C., 315° C., 320° C., 325° C., 330° C., 335° C. and 340° C. and/or at a pressure between 3 and 10 mbar, preferably 5 to 12 mbar, more preferably between 8 and 10 mbar.

The second evaporator and the optional third evaporator are typically, independently from each other, a thin film evaporator or short path evaporator. The evaporators can be either of the same type or different type and are selected the above listed evaporators. Preferably the second evaporator is a short path evaporator, and the third evaporator is a short path evaporator. Typically, the evaporating in the process of the disclosure is performed with any commercially available suitable evaporators. Preferably the evaporating is performed in an evaporator selected from the group defined above. In an especially preferred embodiment of the invention, the evaporation is performed by evaporation using thin film evaporation. Suitable combinations for evaporators (in this order) in the evaporation unit are:

For two stage evaporation:
TF+SP
TF+TF
SP+SP
SP+TF
For three stage evaporation:
TF+TF+SP
TF+SP+SP
SP+SP+SP
TF+TF+TF
where
TF=thin film evaporator
SP=short path evaporator The reaction time of a single evaporation, or the residence time for every separate evaporator in case this step is part of a continuous process, is typically 12-120 seconds, not including the heating time.

According to the embodiments of the disclosure, the temperature of the first distilling column is adjusted to a temperature selected from between 130° C. and 170° C., preferably distilling the first fraction of the first evaporator is done at a temperature between 140° C. 160° C., more preferably between 145° C. and 155° C., including the temperature being a temperature between two of the following temperatures; 130° C., 135° C., 140° C., 145° C., 150° C., 155° C., 160° C., 165° C. and 170° C. and/or at a pressure selected from between 30 to 70 mbar, preferably between 40 and 60 mbar.

According to the embodiments of the disclosure, the temperature of the second distilling column is adjusted to a temperature selected from between 260° C. and 300° C., preferably distilling condensate(s) or vapour(s) of the second evaporator and optionally third evaporator is done at a temperature between 270° C. and 290° C., more preferably between 275° C. and 285° C., including the temperature being a temperature between two of the following temperatures; 260° C., 265° C., 270° C., 275° C., 280° C., 285° C., 290° C., 295° C. and 300° C. and/or at a pressure selected from between 3 to 8 mbar, preferably between 4 and 7 mbar, more preferably between 5 and 6 mbar.

The reaction time of the first distilling column, or the residence time in case this distillation is part of a continuous process, is typically 1-2 hours not including the heating time.

The reaction time of the second distilling column, or the residence time in case this distillation is part of a continuous process, is typically 2-4 hours not including the heating time.

The process of the embodiments of the disclosure, or parts thereof, can be a continuous, batch or semi-batch process.

Typically, the method of the disclosure further comprises upgrading recovered fractions by hydroprocessing for example using a reactor system for catalytic treatment. Preferably the recovered combined crude fatty acid fraction is converted by a hydroprocessing step to biofuels or components thereof. Typically, the recovered combined crude fatty acid fraction is used for hydroprocessing.

Tall oil rosin (TOR) is typically used as a component of adhesives, rubbers, and inks, and as an emulsifier.

The disclosure further relates to the use of a tall oil pitch rosin fraction or tall oil pitch fuel fraction recovered or obtained according to the method of the disclosure in a chemical pulping process, as fuel for boilers, as biofuel in a power plant and/or as raw material in chemical and construction industry. The pitch is typically used as a binder in cement, as an adhesive, and an emulsifier for asphalt.

In some embodiments of the disclosure the tall oil rosin or the tall oil pitch rosin is saponified, typically by NaOH. The obtained rosin soap is typically used in pulping for pulp digestion.

In FIG. 1 tall oil material 10 is fed to a first evaporator 100. A first fraction 11 is fed to a first distilling column 200 and a second fraction 12 is fed to a second evaporator 110. A crude fatty acid fraction 20 as well as optionally other fractions such as water, crude sulphate turpentine 21, 22 are recovered from the first distilling column 200. The concentrate fraction 14 of the second evaporator 110 is fed to a third evaporator 120 and a residue fraction 15 and a fourth fraction 16 are recovered. The third fraction 13 obtained from the second evaporator and the fourth fraction 16 obtained from the third evaporator are fed to a second distilling column 300. A crude fatty acid fraction 30 as well as optionally other fractions such as a tall oil rosin pitch fraction 31 and a tall oil rosin fraction 32 are recovered from the second distilling column 300. The crude fatty acid fraction 20 from the first distilling column 200 and the crude fatty acid fraction 30 from the second distilling column 300 are combined and a combined crude fatty acid fraction 40 is recovered.

Figure 2:
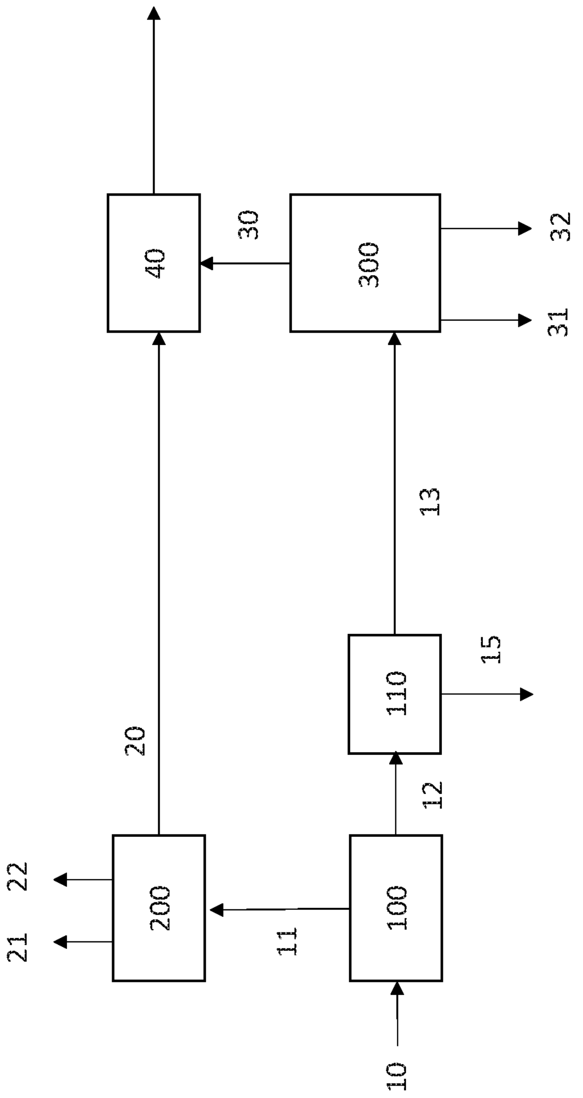
FIG. 2 shows a schematic flow diagram representing one embodiment of the purification process.

In FIG. 2 tall oil material tall oil material 10 is fed to a first evaporator 100. A first fraction 11 is fed to a first distilling column 200 and a second fraction 12 is fed to a second evaporator 110. A crude fatty acid fraction 20 as well as optionally other fractions such as water, crude sulphate turpentine 21, 22 are recovered from the first distilling column 200. A residue fraction 15 and a third fraction 13 are recovered from the second evaporator. The third fraction 13 is fed to a second distilling column 300. A crude fatty acid fraction 30 as well as optionally other fractions such as a tall oil rosin pitch fraction 31 and a tall oil rosin fraction 32 are recovered from the second distilling column 300. The crude fatty acid fraction 20 from the first distilling column 200 and the crude fatty acid fraction 30 from the second distilling column 300 are combined and a combined crude fatty acid fraction 40 is recovered.

Optional Hydroprocessing Step

In the embodiments of the disclosure, the recovered combined crude fatty acid fraction may be subjected to a catalytic hydroprocessing step carried out in the presence of hydrogen, to yield an effluent, which may be subjected to a second fractionation and/or further processing steps for providing liquid fuels and other chemicals. Gasoline fractions that can be used as a bio-naphtha component or as raw material for bio-plastics may also be produced.

The hydroprocessing step may be carried out for effecting at least one of hydrodeoxygenation, hydrodewaxing, hydroisomerization, hydrocracking, hydrodearomatization and ring opening reactions.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina (Al2O3), gamma-alumina, zeolite-alumina, alumina-silica (SiO2), ZrO2, alumina-silica-zeolite and activated carbon. Preferably a mixture of CoO and MoO3 (CoMo) and/or a mixture of NiO and MoO3 (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, preferably from 30 to 120 bar.

In an embodiment, hydrogen partial pressure is maintained in the range from 50 to 250 bar, preferably from 80 to 200 bar, more preferably from 80 to 110 bar.

The hydroprocessing is carried out at a temperature in the range of 100 to 450° C., preferably 280° C. to 450° C., more preferably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is preferably in the range of 0.1-5 and more preferably in the range of 0.3-0.7.

The ratio of H2/feed varies between 600 and 4000 NI/I, preferably of 1300-2200 Nl/l.

The feed is pumped to the hydroprocessing reactor at a desired speed. Suitably the feed rate LHSV (liquid hourly space velocity) of the feed material is in the range of 0.01-10 h-1, preferably 0.1-5 h-1.

The hydroprocessing step may be carried out as a one-step process or as a two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

EXAMPLES

Example 1

A crude tall oil according to Table 1 (CTO 3) is treated according to the process of FIG. 1.

The crude tall oil was first evaporated in a short path evaporator. At 100 mbar pressure and 255° C. temperature the fraction comprising water, crude sulphate turpentine (CST), light fatty acids and light neutrals (first fraction) was 9.1 wt % and at a temperature of 295° C. the amount of the first fraction was 23.3 wt %. At lower temperatures the amounts were lower and at higher temperatures significantly higher. At lower pressure the first fraction is over 20 wt % already at 255° C. At 200 mbar pressure and 2550° C. temperature the first fraction was 6.5 wt % and at a temperature of 295° C. the amount of the first fraction was wt %. The analysis results are shown in table 9.

TABLE 9

First fraction analysis results

| Description | Analysis method | 1. fraction 255° C. 100 mbar | 1. fraction 295° C. 100 mbar | 1. fraction 255° C. 200 mbar | 1. fraction 295° C. 200 mbar |
|---|---|---|---|---|---|
| Resin acids Wt-% | SCAN-T 14 | 5.3 | 11.4 | 3.6 | 7.8 |
| Acid number mg/KOH/g | SCAN-T 11 | 60.0 | 131.9 | 44.0 | 99.6 |
| Neutrals Wt-% | Internal | 69.5 | 32.9 | 77.6 | 49.4 |
| Fatty acids Wt-% | Internal | 25.2 | 55.7 | 18.8 | 42.8 |

A first fraction (9 wt % of the tall oil material) is obtained at 255° C. temperature and 100 mbar pressure and it is fed to a distilling column dimensioned for the first fraction. A crude fatty acid fraction (about 6 wt % of the tall oil material), a crude sulphate turpentine fraction (about 2 wt % of the tall oil material) and a water fraction are recovered. Analysis results for a crude sulphate turpentine fraction are shown in Table 10. The acid number of the crude sulphate turpentine fraction is 0 measured according to SCAN-T 11.

TABLE 10

Crude sulphate turpentine fraction example

| | Turpentine fraction |
|---|---|
| Alfa-pinene, GC wt-% | 52.4 |
| Camphene, GC wt-% | 1.6 |
| Beta pinene, GC wt-% | 4.8 |
| Delta-3-carene, GC wt-% | 22.1 |
| Limonene, GC wt-% | 6.0 |
| Other C-10 terpenes, GC wt-% | 3.3 |
| Other terpenes 2, GC wt-% | 6.5 |

The second fraction from the first evaporator, comprising fatty acids, resin acids, neutral substances, and residue components, is fed to a second short path evaporator (SPE). A heavy fraction is separated in two evaporators, SPEs, in series. Most of the impurities are removed along with the heaviest components. The feed for the SPEs is assumed to be free from water and crude sulphate turpentine. The concentrate fraction is fed to a further short path evaporator and a tall oil pitch residue fraction (about 20 wt % of the tall oil material), and a fourth fraction are recovered. The size of the second and third evaporator is adjusted so that the feed to the second distilling column consists of about 55-60 wt % of the third fraction and about 40-45 wt % of the fourth fraction.

The combined condensate of the third fraction obtained from the second evaporator and the fourth fraction obtained from the third evaporator (the combined fraction is about 70 wt % of the tall oil material) are fed to a second distilling column.

A crude fatty acid fraction (55 wt % of the tall oil material), a tall oil rosin pitch fraction and a tall oil rosin fraction are recovered from the second distilling column. The crude fatty acid fraction from the first distilling column and the crude fatty acid fraction from the second distilling column are combined and a combined crude fatty acid fraction is recovered. The first CFA fraction is about 10 wt % of the combined crude fatty acid fraction. Analysis result for a combined crude fatty acid fraction is shown in Table 11.

TABLE 11

Analysis of combined crude fatty acid fraction

| Description | Analysis method | 2. CFA 1 |
|---|---|---|
| Resin acids Wt-% | SCAN-T 14 | 6 |
| Acid number mg/KOH/g | SCAN-T 11 | 177 |
| Neutrals Wt-% | Internal | 11 |
| Fatty acids Wt-% | Internal | 83 |

TABLE 12

Impurities of combined crude fatty acid fraction

| Compound | Analysis method | CFA ppm |
|---|---|---|
| Tot. restricted metals, (including Ca, Fe, K, Mg, Na, As) | ASTM D 5185 | <4.1 |
| Silicon, Si | ASTM D 5185 | <1 |
| Phosphorous, P | ASTM D 5185 | <1 |
| Sodium, Na | ASTM D 5185 | <1 |
| Potassium, K | ASTM D 5185 | <2 |
| Calcium, Ca | ASTM D 5185 | <0.1 |
| Magnesium, Mg | ASTM D 5185 | 0.014 |
| Iron, Fe | ASTM D 5185 | <0.1 |
| Arsenic, As | ASTM D 5185 | <0.8 |

The invention claimed is:

1. A method for refining crude tall oil, characterized in that the method comprises (a) evaporating tall oil material (10) in a first evaporator (100) at a temperature between 255 and 295° C. and a pressure between 80 and 220 mbar to obtain a first fraction (11) comprising crude sulphate turpentine, light fatty acids, light neutrals, silicon compounds and water and a second fraction (12) comprising fatty acids, resin acids, neutral substances and residue components;

(b1) evaporating said second fraction (12) in a second evaporator (110) at a temperature between 230 and 270° C. and a pressure between 5 and 20 mbar to obtain a third fraction (13) comprising fatty acids, resin acids and light neutral substances, and a first concentrate fraction (14); and evaporating said first concentrate fraction (14) in a third evaporator (120) at a temperature between 280 and 320° C. and a pressure between 5 and 20 mbar to produce a fourth fraction (16) comprising fatty acids, resin acids and light neutral substances, and a residue fraction (15); or alternatively (b2) evaporating said second fraction (12) in a second evaporator (110) at a temperature between 300 and 340° C. and a pressure between 3 and 10 mbar to obtain a third fraction (13) comprising fatty acids, resin acids and neutral substances and a residue fraction (15);

whereafter the method further comprises (c) distilling said first fraction (11) in a first distilling column (200) to obtain at least a crude fatty acid fraction (20);

(d) distilling said third (13) and said fourth fraction (16) of step (b1) or said third fraction (13) of step (b2) in a second distilling column (300) to obtain at least a crude fatty acid fraction (30); and (e) recovering a combined crude fatty acid fraction (40) from said first distilling column (200) and said second distilling column (300).

2. The method according to claim 1, characterized in that the feed to the first fraction (11), is 6-25 wt % of the tall oil material used as feedstock.

3. The method according to claim 1, characterized in that the method further comprises recovering a crude sulphate turpentine fraction and a water fraction (21, 22) from said first distilling column (200).

4. The method according to claim 1, characterized in that the total amount of restricted metals, including Ca, Fe, K, Mg, Na, As, of the combined crude fatty acid fraction is below 20 ppm.

5. The method according to claim 1, characterized in that the method further comprises obtaining a tall oil rosin fraction (32) and/or tall oil pitch rosin fraction (31) from said second distilling column (300).

6. The method according to claim 5, characterized in that the method further comprises obtaining rosin soap from said tall oil rosin fraction and/or from said tall oil pitch rosin fraction.

7. The method according to claim 1, characterized in that the size of the second (110) and third evaporator (120) is adjusted.

8. The method according to claim 1, characterized in that the tall oil material (10) is crude tall oil or a mixture of different crude tall oils.

9. The method according to claim 1, characterized in that evaporating tall oil material (10) in said first evaporator (100) is done at a temperature between 260 and 290° C. and/or at a pressure selected from between 80 and 220 mbar.

10. The method according to claim 1, characterized in that evaporating said second fraction (12) in a second evaporator (110) in step (b1) is done at a temperature between 235 and 265° C. and a pressure selected from between 5 and 20 mbar.

11. The method according to claim 1, characterized in that evaporating the concentrate fraction (14) of the second evaporator (110) in a third evaporator (120) in step (b1) is done at a temperature between 285 and 315° C. and a pressure selected from between 3 and 15 mbar.

12. The method according to claim 1, characterized in that evaporating said second fraction (12) in a second evaporator (110) in step (b2) is done at a temperature between 310 and 330° C. and at a pressure selected from between 3 and 10 mbar.

13. The method according to claim 1, characterized in that distilling the first fraction (11) in the first distilling column (200) is done at a temperature between 130° C. and 170° C. and a pressure selected from between 30 to 70 mbar.

14. The method according to claim 1, characterized in that distilling the third fraction (13) and optional fourth fraction (16) of the second evaporator (110) and optional third evaporator (120) in the second distilling column (300) is done at a temperature between 260° C. and 300° C. and a pressure selected from between 3 to 8 mbar.

15. The method according to claim 1, characterized in that the process further comprises converting said recovered combined crude fatty acid fraction (40) by hydroprocessing to biofuels or components thereof.

16. The method according to claim 1, wherein the recovered combined crude fatty acid fraction (40) is a feed for hydroprocessing.

17. The method according to claim 1, characterized in that the feed to the first fraction (11), is 6-20 wt % of the tall oil material used as feedstock.

18. The method according to claim 1, characterized in that the feed to the first fraction (11), is 8-15 wt % of the tall oil material used as feedstock.

19. The method according to claim 1, characterized in that the tall oil material (10) is crude tall oil or a mixture of different crude tall oils, wherein the tall oil material comprises above 50 ppm impurities.

20. The method according to claim 1, characterized in that the tall oil material (10) is crude tall oil or a mixture of different crude tall oils, wherein the tall oil material comprises 50-700 ppm impurities.

21. The method according to claim 1, characterized in that the tall oil material (10) is crude tall oil or a mixture of different crude tall oils, wherein the tall oil material comprises 100-500 ppm impurities.

22. The method according to claim 1, characterized in that the tall oil material (10) is crude tall oil or a mixture of different crude tall oils, wherein the tall oil material comprises 250-400 ppm impurities.

* * * * *